United States Patent
Kuipers et al.

(10) Patent No.: US 10,122,641 B1
(45) Date of Patent: Nov. 6, 2018

(54) SYSTEMS AND METHODS FOR BONDING MULTIPLE DATA LINKS WITH DIFFERENTIAL DELAY

(71) Applicant: ADTRAN, Inc., Huntsville, AL (US)

(72) Inventors: Martin Kuipers, Dallgow-Doberitz (DE); Richard L. Goodson, Huntsville, AL (US); Fred Chu, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 146 days.

(21) Appl. No.: 15/165,966

(22) Filed: May 26, 2016

(51) Int. Cl.
| | |
|---|---|
| H04L 12/801 | (2013.01) |
| H04L 12/861 | (2013.01) |
| H04L 12/28 | (2006.01) |
| H04B 3/46 | (2015.01) |
| H04L 1/08 | (2006.01) |
| H04L 1/16 | (2006.01) |

(52) U.S. Cl.
CPC .............. H04L 47/34 (2013.01); H04B 3/46 (2013.01); H04L 1/08 (2013.01); H04L 1/1607 (2013.01); H04L 12/2878 (2013.01); H04L 49/9057 (2013.01)

(58) Field of Classification Search
CPC ....... H04L 47/34; H04L 12/2878; H04L 1/08; H04L 49/9057; H04L 1/0001; H04L 49/9094
See application file for complete search history.

(56) References Cited

U.S. PATENT DOCUMENTS

| | | | |
|---|---|---|---|
| 7,113,521 B2 * | 9/2006 | Miller | H04L 1/06 370/474 |
| 7,577,088 B2 | 8/2009 | Tidwell et al. | |
| 7,760,624 B1 | 7/2010 | Goodson et al. | |
| 7,861,002 B2 | 12/2010 | Puon et al. | |
| 8,555,149 B2 | 10/2013 | Pons et al. | |
| 8,693,314 B1 | 4/2014 | Horton et al. | |
| 2002/0010866 A1 * | 1/2002 | McCullough | H04L 63/0272 726/3 |
| 2009/0086759 A1 * | 4/2009 | Heise | H04L 1/0085 370/474 |
| 2010/0046549 A1 * | 2/2010 | Heise | H04L 1/0001 370/474 |
| 2014/0351300 A1 * | 11/2014 | Uppu | H04L 12/6418 707/827 |
| 2015/0082115 A1 * | 3/2015 | Xia | G06F 11/085 714/758 |

* cited by examiner

Primary Examiner — Hassan Kizou
Assistant Examiner — Deepa Belur
(74) Attorney, Agent, or Firm — Maynard Cooper & Gale, P.C.; Jon E. Holland

(57) ABSTRACT

An aggregation module receives a data packet. A bonding engine of the aggregation module breaks the data packet into fragments, and each fragment is part of a bonding group that is assigned a sequence identifier that allows the data packet to be reconstructed from the fragments. Each fragment is provided to one of a plurality of transmitters to be transmitted over a data link. When a noise event occurs on one of the data links, the fragments stored at the transmitter associated with that data link are transferred to another transmitter within the same bonding group for transmission over a different data link.

21 Claims, 7 Drawing Sheets

SYSTEMS AND METHODS FOR BONDING MULTIPLE DATA LINKS WITH DIFFERENTIAL DELAY

RELATED ART

In telecommunication networks, multiple physical links (e.g., data links such as subscriber lines) are sometimes used to provide a virtual channel having a higher data bandwidth than that of any of the individual links making up the virtual channel. The logic used to implement the virtual channel is referred to as a "bonding engine," and the physical links are referred to as being "bonded" together by the bonding engine to form the virtual channel. Further, the multiple links that are bonded together to form a virtual channel are referred to as a "bonding group."

Typically, a bonding engine is located within a location such as a central office (CO) in communication with a network, and is referred to hereafter as a "network bonding engine." Such a network bonding engine may be running on a DSL Access Multiplexer (DSLAM). In the downstream direction, the network bonding engine receives a data packet to be communicated to a customer premises (CP) and divides the data packet into fragments. The fragments are assigned identifiers that define the sequential ordering of the fragments and are distributed to transceivers to be transmitted over multiple data links. Those fragments are then transmitted over multiple data links extending from a network facility (e.g., a central office) to the customer premises. Each fragment is transmitted over a respective one of the data links and is received by customer premises equipment (CPE).

A bonding engine running on the CPE, referred to hereafter as a "CP bonding engine," receives the fragments from the multiple data links. The fragments are stored in memory, and the CP bonding engine uses the identifiers to reassemble the fragments in sequential order into the original packet. However, there are limitations on the memory that is available on the CPE to store the fragments. Thus, it is required that all of the fragments associated with a packet are received within a specified differential delay time. For example, the maximum differential delay in bits for data transmitted using the IEEE 802.3ah-2004 standard is 15,000 bits. Under IEEE 802.3ah-2004 and similar standards, typical DSL transceivers such as G.993.2 transceivers can be configured in a manner such that the differential delay remains within the required bounds.

Note that a similar process may be used in the upstream direction to fragment a packet into a plurality of packets at the CPE and to transmit the fragments across multiple data links to the network bonding engine, which reassembles the fragments into the original upstream data packet. There are similar differential delay requirements in the upstream direction as there are in the downstream direction.

Newer DSL standards such as VDSL2 with retransmission (e.g., ITU-T G.933.2 in combination with ITU-T G.998.4) and G.fast (e.g., ITU-T G.9701) pose a number of problems for using bonding for DSL transmissions. Retransmission requirements imposed by these protocols result in delays that exceed the allowable differential delay. Moreover, according to ITU-T G.9701, the transmission equipment is required to have the ability to support impulse noise protection (INP) against single high-impulse noise events (SHINE) of up to 10 ms at all supported bit rates without the loss of user data. A fragment delayed by up to 10 ms would far exceed the allowable differential delay. Accordingly, a heretofore unaddressed need exists in the industry for a system and method that allows for bonding under these conditions.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for transferring bonded fragments of data between transmitters in response to a noise event. An aggregation module receives from a network a stream of data packets to be transmitted to customer premises equipment (CPE) at one or more customer premises. A bonding engine of the aggregation module breaks each data packet into bonded fragments. Each fragment is assigned a sequence identifier that will allow the packet to be reconstructed from the plurality of fragments, and each fragment is then assigned to one of a plurality of transmitters to be transmitted over a particular data link to the CPE.

In one embodiment, first and second transmitters are associated with first and second data links, respectively. Each transmitter receives bonded fragments that are to be sent over the transmitter's data link, stores those fragments in its buffer, and under normal conditions, transmits the fragments over its associated data link. In the case of a noise event such as a single high-impulse noise event (SHINE) event on one of the data links, the bonded fragments stored in the buffer of the transmitter associated with that data link are transferred to the buffer of the other transmitter. The other transmitter transmits the fragments over the data link that is not impacted by the noise event.

Figure 1:
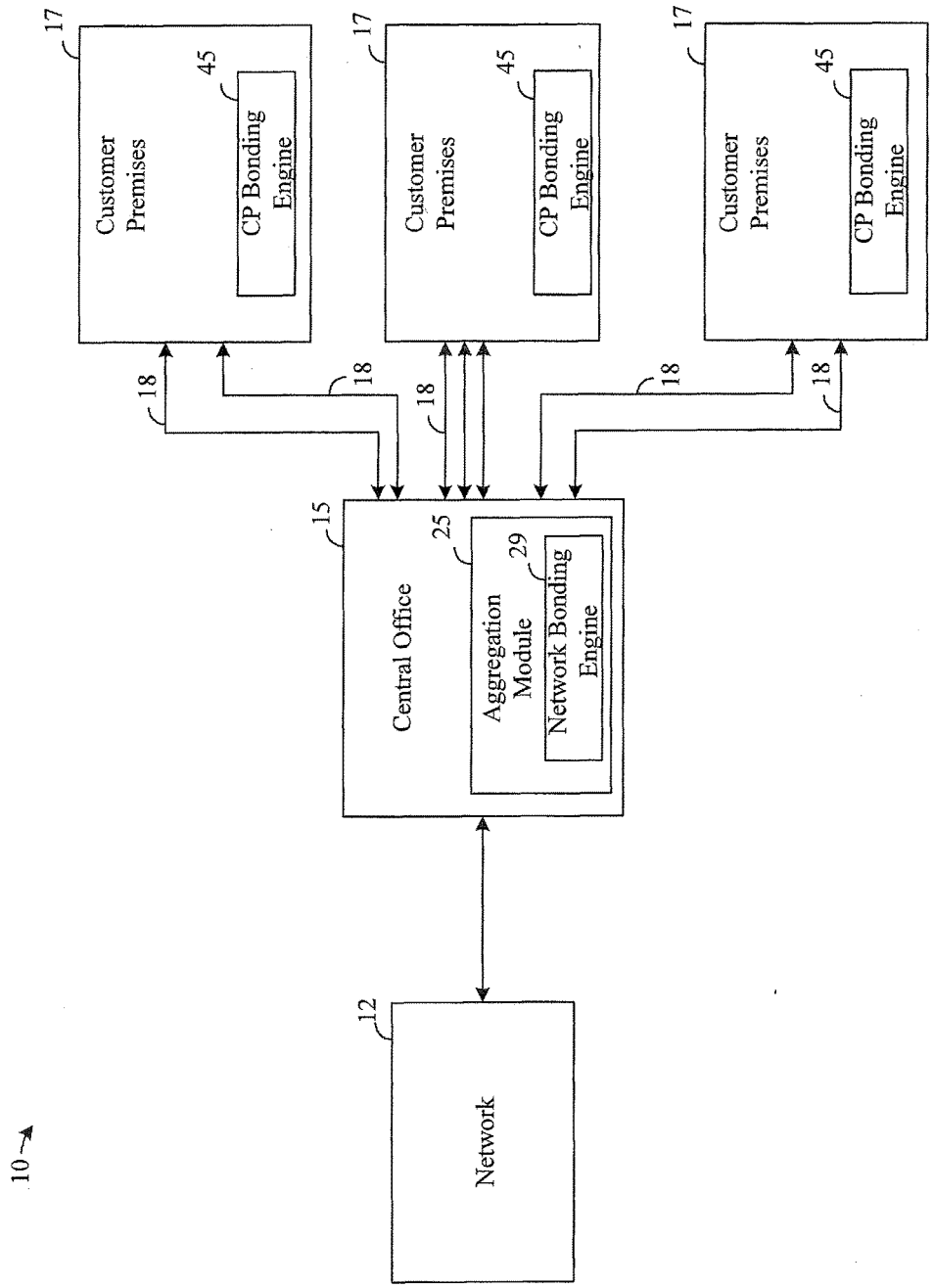
FIG. 1 is a block diagram illustrating an exemplary embodiment of a telecommunication system.

FIG. 1 depicts an exemplary embodiment of a telecommunication system 10. The system 10 has a network 12, such as the Public Switched Telephone Network (PSTN) or Internet, that routes data. In the downstream direction, a network facility, such as a central office 15, receives from the network 12 data destined for equipment at customer premises 17 and transmits such data to the customer premises 17 via a plurality of data links 18, such as subscriber lines (e.g., twisted-wire pairs). Note that, for simplicity of illustration, FIG. 1 shows two or three data links connecting each customer premises to the central office 15, but any number of data links (one or more) 18 may be connected to equipment at a given customer premise 17. In the upstream direction, data from the customer premises 17 are received by the central office 15, which interfaces such data with the network 12 for transmission.

Various types of protocols may be used for the communication between the central office 18 and the customer premises 17. As an example, data may be communicated between the central office 15 and any customer premises 17 via various digital subscriber line (DSL) protocols, such as Asymmetric Digital Subscriber Line (ADSL), High-Bit-rate Digital Subscriber Line (HDSL), HDSL2, HDSL4, Very-high-data-rate Digital Subscriber Line (VDSL), Symmetric Digital Subscriber Line (SDSL), Symmetric High-speed Digital Subscriber Line (SHDSL), G.fast, etc. In other embodiments, other types of non-DSL and DSL protocols may be used to communicate data between the central office 15 and the customer premises 17. As shown by FIG. 1, the central office 15 has at least one aggregation module 25 on which a bonding engine 29 is mounted. Each customer premises 17 has a CP bonding engine 45 mounted therein.

Figure 2:
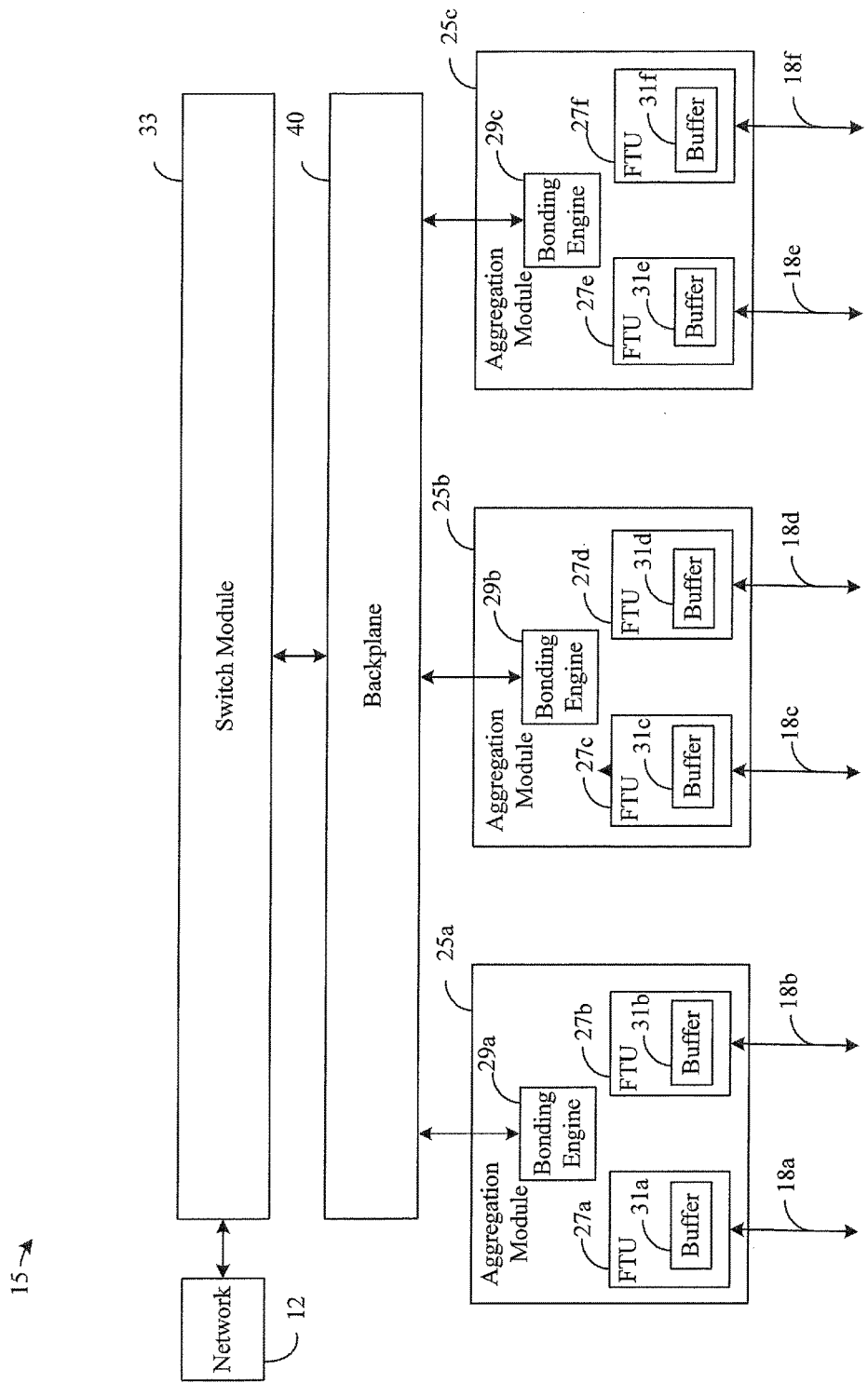
FIG. 2 is a block diagram illustrating an exemplary embodiment of equipment at a network facility, such as a central office.

FIG. 2 depicts an exemplary embodiment of equipment residing at the central office 15, other network facility (such as remote terminal), or at any intermediate point between the central office and one or more customer premises. Such equipment includes a plurality of aggregation modules 25 *a-c*, such as a physical-medium-attachment aggregation function (PAF) modules. Each aggregation module 25 *a-c* is coupled to and terminates a subset of data links 18 *a-f*. In particular, aggregation module 25*a* has transceivers 27 *a-b* that are coupled to and interface with data links 18 *a-b*, aggregation module 25*b* has transceivers 27 *c-d* that are coupled to and interface with data links 18 *c-d*, and aggregation module 25*c* has transceivers 27 *e-f* that are coupled to and interface with data links 18 *e-f*. Each transceiver 27 *a-f* comprises a transmitter for transmitting data across a respective data link and a receiver for receiving data from a respective data link, which may be the same data link coupled to its corresponding transmitter.

It will be understood that any suitable transceiver may be used in accordance with the present disclosure. Exemplary transceivers may include various types of DSL transceivers, such as ADSL, HDSL, HDSL2, HDSL4, VDSL, VDSL2, SDSL, SHDSL, or G.fast, but non-DSL transceivers (e.g., optical transceivers) are possible in other embodiments. In the embodiments described herein, the transceiver may be a G.fast transceiver, also referred to as a fast transceiver unit (FTU), and transceivers will be referred to hereafter as FTUs for simplicity of illustration. However, any of the FTUs described herein can be other types of transceivers in other embodiments. Each FTU 27 *a-f* has a unique port identifier that distinguishes the FTU from the other FTUs of the aggregation modules 25 *a-c*. A portion of each port identifier identifies the aggregation module 25 *a-c* on which the FTU 27 *a-f* resides. Thus, the port identifiers may be used to switch data between the aggregation modules 25 *a-c*, as will be described in more detail hereafter.

As shown by FIG. 2, each aggregation module 25 *a-c* has at least one bonding engine 29 *a-c*. Each aggregation module 25 *a-c* is coupled to switch module 33 via backplane 40, the switch module 33 switching data between the aggregation modules 25 *a-c* and the network 12. Although the bonding engines 29 *a-c* are depicted as located on aggregation modules 25 *a-c* in FIG. 2, it will be understood that a bonding engine 29 may also be located at other locations, such as on switch module 33, and that such a bonding engine 29 may include any or all of the functionality described for any of the bonding engines described herein.

The switch module 33 receives from the network 12 data packets that are destined for equipment at a customer premises 17. Each data packet has a header and a data portion. Control and transmission information is included in the header, and payload data is included in the data portion. As an example, the header of a data packet may include a destination address identifying a communication device at a customer premises 17 to which the data packet is to be transmitted. In one exemplary embodiment, the header includes a Virtual Local Area Network (VLAN) tag. Other types of information may be included in the header, as is known in the art. In one exemplary embodiment, the data packets received from the network 12 are in accordance with Ethernet protocol, but other types of packet protocols may be used in other embodiments.

Generally, for each data packet received from the network 12, the switch module 33 transmits the data packet to the appropriate aggregation module 25 *a-c* (via backplane 40) based on information in the data packet's header, such as the destination address or VLAN tag included in the header. In one exemplary embodiment, all of the data packets to be carried by the same bonding group (e.g., having the same destination address or VLAN tag) are transmitted to the group's bonding engine, which may be located on an aggregation module 25 *a-c* as shown by FIG. 2, although other locations for the bonding engine are possible as will be described in more detail below. For example, assume that a customer premises 17 is serviced by a bonding group for which the bonding engine 29*a* bonds a plurality of the data links 18 *a-f*. Upon receiving a data packet, referred to hereafter as the "original data packet," that is to be communicated to such customer premises 17 by the bonding group, the switch module 33 is configured to transmit the original data packet to the aggregation module 25*a* that includes bonding engine 29*a* via backplane 40. After the original data packet is received by the module 25*a*, the bonding engine 29*a* fragments the original data packet into a plurality of fragments. Each fragment is to be transmitted by a respective one of the data links (e.g., a subset of data links 18 *a-f*) of the bonding group.

Each fragment is a data packet that may be smaller than the original data packet. In this regard, each fragment has a header and a data portion. For each fragment, control information is included in the header, and payload data (i.e., a portion of the original data packet) is included in the data portion. The header includes various control information that is used by the aggregation modules to process the fragment so that it is transmitted across one of the data links of the packet's bonding group. The header may also include a sequence identifier that indicates the fragment's sequence or order relative to other fragments from the same original data packet. The sequence identifier is used to reassemble the fragments into the proper order at the CPE in order to recover the original data packet. If desired, information used by the aggregation modules to process the fragment may be stripped by the FTU 27 before transmitting the fragment across the data link 18 *a-f* to the CPE in order to reduce the amount of information communicated across the data links 18 *a-f*.

Once an FTU 27 *a-f* receives a fragment from one of bonding engines 29 *a-c*, the FTU 27 *a-f* processes the fragment for transmission over the respective data link 18 *a-f*. Although any suitable processing may be performed, in an exemplary embodiment the fragment is processed to generate a data transfer unit (DTU) for transmission to a FTU at a CP. Various kinds of data formats or protocols may be used to generate DTUs from the fragments for transmission to the CPE, as is known in the art. For example, the FTU of an aggregation module 25 a-f may encapsulate the fragment with physical layer information necessary for transmission over its corresponding data link 18 a-f to the customer premises 17.

Each FTU 27 includes a respective buffer 31. Each buffer includes memory for storing encapsulated fragments (e.g., DTUs) for eventual transmission over the data links 18. In some embodiments, each buffer 31 includes a plurality of queues that allow fragments to be prioritized, for example, if a bonding engine 29 indicates that a particular subset of fragments has a higher priority for transmission. In some embodiments, data in the buffer 31 is capable of being reordered or otherwise processed out-of-order, such that newly received fragments may be placed in front of earlier received fragments in the buffer 31. For example, a bonding engine 29 may transfer fragments from one of FTUs 27 a-f to another of FTUs 27 a-f. In one embodiment, transferred fragments may be stored within buffer 31 along with the preexisting fragments based on the assigned sequence identifiers for the transferred fragments. Because the transferred fragments were transferred as a result of delays in transmission, the values for the sequence identifiers are likely to result in the transferred fragments being pulled from the buffer 31 for transmission to CPE prior to many of the preexisting fragments within buffer 31.

Each FTU 27 also communicates status information regarding its respective buffer 31 to respective a bonding engine 29. An FTU 27 provides information regarding the fragments that have been transmitted from the buffer as well as fragments that are stored in the buffer. This information may be communicated periodically, upon request by the bonding engine 29, in response to an event (e.g., the FTU 27 identifying occurrence of a noise event, such as a SHINE event), or in any other suitable manner. In one exemplary embodiment, an FTU 27 provides to the bonding engine 29 an identifier (e.g., sequence identifier) of the last fragment that was transmitted over the data link 18. The bonding engine 29 has an ordered listing of all fragments that were provided to that particular FTU 27. Based on the identifier for the last transmitted fragment, the bonding engine 29 is able to determine which fragments are still stored in the buffer 31 of the FTU 27.

As an example, the bonding engine 29 may store the sequence identifier of each fragment that is provided to a particular FTU 27 for transmission. Further, the sequence identifiers may be ordered such that a sequence identifier is lower if it its corresponding fragment is earlier in the sequence of fragments, although other ordering schemes are possible in other embodiments. Further, the fragments may be transmitted to the FTUs based on their sequence identifiers such that, in normal operation, fragments with lower sequence identifiers arrive at the FTU before fragments with higher sequence identifiers, noting that the sequence identifiers are not necessarily consecutive for the FTU 27 since some fragments of the same sequence are normally provided to other FTUs. In such example, the bonding engine 29 can determine which fragments remain in the particular FTU 27 based on the sequence identifier of the last packet successfully transmitted by the FTU 27. In this regard, in normal operation, the fragments that remain in the FTU 27 are the ones that (1) have been sent by the bonding engine 29 to the FTU 27 and (2) have sequence identifiers higher than the one for the most-recently transmitted fragment.

An FTU 27 also provides other information to the bonding engine 29, such as an XOFF/XON indicator and status information. Such XOFF/XON indicator may indicate to the bonding engine 29 whether the FTU 27 is accepting additional fragments from the bonding engine 29 for transmission over the data link 18. This may be based on the buffer 31 being full or based on other reasons that prevent transmission, such as a SHINE event. Status information may include a number of retransmissions, a number of failed transmissions, an indication of line conditions of the data link 18, an indication of the occurrence of noise or other events (e.g., SHINE events), information required for the transfer of data to another FTU, status of buffer data, any other suitable information, or any combination thereof.

One or more of the FTUs 27 of a bonding group may be located at the same aggregation module 25 on which the group's bonding engine 29 resides. If it is desired to transfer fragments to this FTU 27, it is unnecessary for the fragments to be transferred through the switch module 33. As an example, assume that the bonding engine 29a bonds a plurality of data links 18 a-f, including one data link 18a that is coupled to and terminated by the FTU 27a of aggregation module 25a on which the bonding engine 29a resides. When the bonding engine 29a provides a fragment to be carried by data link 18a, the fragment may be transferred directly to the FTU 27a without being communicated through the switch module 33. However, fragments provided by the bonding engine 29a to be carried by data links 18 c-f may be transferred to the aggregation modules 25 b-c through the switch module 33. In other embodiments, other techniques can be used to transfer fragments from one aggregation module to another. As an example, it is possible to transmit a fragment across the backplane 40 from the aggregation module 25a to another aggregation module 25b or 25c without the fragment passing through the switch module 33. Thus, any of the bonding engines 29 a-c can bond any of the data links 18 a-f regardless of whether a given data link 18 a-f is terminated by an FTU a-f located at the same aggregation module 25 a-c on which the bonding engine 29 a-c resides.

In some embodiments, at least some of the data links 18 are bonded by a bonding engine 29 residing on an aggregation module 25 that is different from the aggregation module 25 that terminates the data links 18 or on other types of modules, such as switch module 33. By having data links 18 of the same bonding group terminated by multiple aggregation modules 25, the bonding group is able to survive a failure on any one of the aggregation modules 25. For example, assume that bonding engine 29a bonds a plurality of data links 18a, 18b, and 18d, which are terminated by aggregation modules 25a and 25b. If the aggregation module 25b fails, then communication across the data link 18d coupled to the failed aggregation module 25b may be lost at least temporarily. In such an instance, the bonding group's traffic may be communicated across the data links 18a and 18b, which are terminated by the functioning aggregation module 25a. Note that the aggregate data rate for the virtual channel provided by the bonding group may be slightly degraded due to the loss of the data link 18d terminated by the failed aggregation module 25b, but the bonding group nevertheless survives the module failure. Commonly-assigned U.S. Pat. No. 8,908,500, entitled "Systems and Methods for Protecting Bonding Engines in Network Communications," and filed on Jan. 23, 2009, which is incorporated herein by reference, describes exemplary techniques for protecting bonding groups and, in particular, bonding engines that reside on failed aggregation modules.

Commonly-assigned U.S. Pat. No. 7,760,624, entitled "Network Access Device and Method for Protecting Subscriber Line Communications," and filed on Mar. 8, 2005, which is incorporated herein by reference, describes exemplary techniques for bonding across multiple modules.

In some embodiments, there is only one bonding engine 29 to which all of the data packets to be communicated by a bonding group are transmitted. Such a bonding engine may be located on any of the aggregation modules 25 a-c. However, in other embodiments, it is possible to distribute the bonding engine for any bonding group across multiple aggregation modules 25 a-c, if desired. In addition, the same bonding engine can be used to bond multiple bonding groups.

Note that data from the customer premises 17 may be communicated via paths reverse to those described above. In this regard, assume that a bonding engine 45 (FIG. 1) at a customer premises 17 fragments a message into a plurality of fragments that are communicated via a bonding group to the central office 15. The bonding group's bonding engine 29 at the central office 15 is configured to receive each of the fragments and to reassemble the fragments into the message originally fragmented by the CP bonding engine 45. The message is then packetized and transmitted through backplane 40 to the switch module 33 and to the network 12.

Each aggregation module 25 comprises any suitable hardware or combination of hardware and software for performing the operations described herein and for terminating and driving the data links 18 a-f. For example, each bonding engine 29 a-c of an aggregation module 25 may be embodied on a digital signal processor (DSP), and a separate DSP may be provided for each set of FTUs (e.g., one DSP each for FTUs 27 a-b, 27 c-d, and 27 e-f) terminated by such aggregation module 25. However, it will be understood that the components of aggregation modules 25 a-c may be implemented with any suitable hardware, software, firmware, or combination thereof, for performing the functions described herein and other functions.

Figure 3:
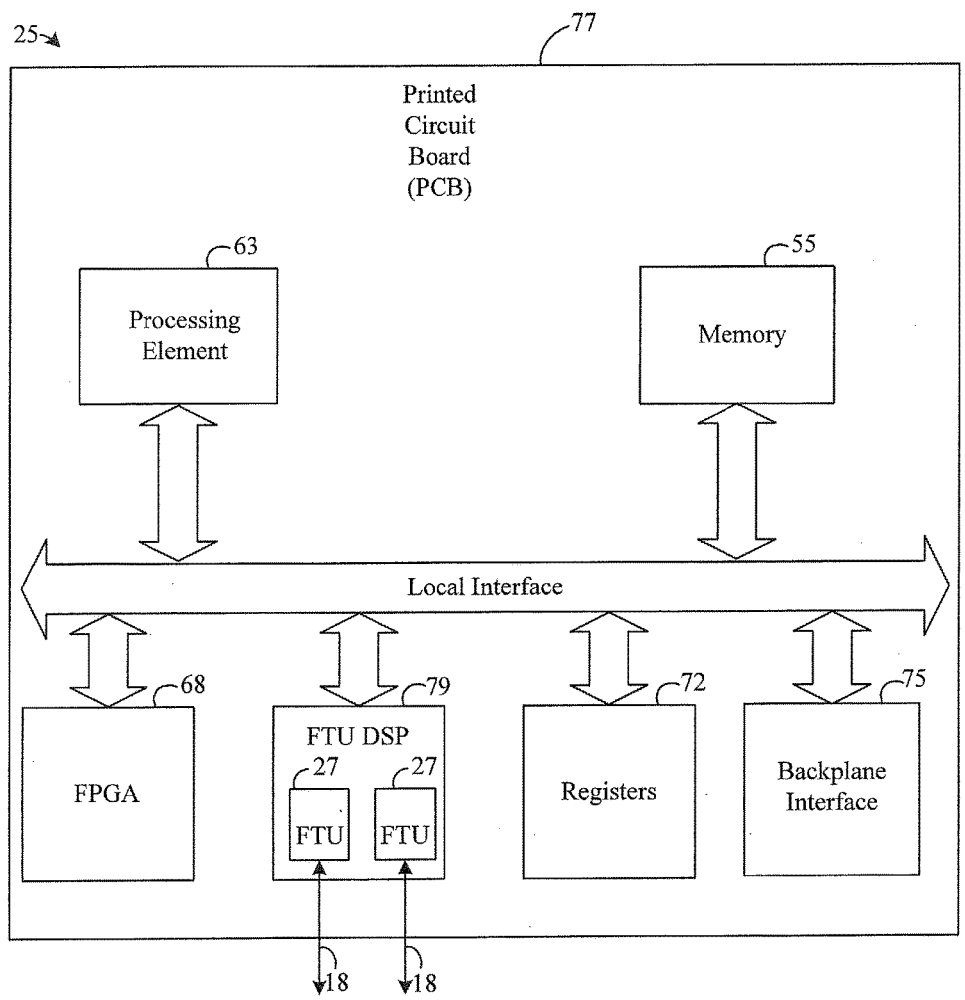
FIG. 3 is a block diagram illustrating an exemplary embodiment of an aggregation module, such as is depicted by FIG. 2.

FIG. 3 depicts an exemplary embodiment of an aggregation module 25. Although a bonding engine for the aggregation module 25 may be implemented in any suitable manner, an exemplary bonding engine 29 may be embodied in software that runs on a processing element 63 and is stored in memory 55, and/or hardware logic of a field programmable gate array (FPGA) 68. In one exemplary embodiment, each aggregation module 25 a-c shown by FIG. 2 is configured as shown by FIG. 3, but other configurations of the modules 25 a-c are possible in other embodiments.

The exemplary embodiment of the aggregation module 25 depicted by FIG. 3 comprises at least one processing element 63, such as a digital signal processor (DSP) or a central processing unit (CPU), that communicates to and drives the other elements within the module 25 via a local interface 66, which can include at least one bus. For example, the processing element 63 retrieves and executes instructions from memory 55 to communicate with and control other elements of aggregation module 25.

Furthermore, in an exemplary embodiment, aggregation module 25 comprises FPGA 68 for implementing hardware portions of the module 25, such as aspects of the module's bonding engine 29. The aggregation module 25 also has registers 72 for storing various configuration settings, as will be described in more detail hereafter. A backplane interface 75 comprises a connector for interfacing the module 25 with a backplane of a chassis (not shown in FIG. 3), as will be described in more detail hereafter.

The aggregation module 25 further has an FTU DSP 79 that performs digital processing for two FTUs 27 coupled to two data links 18. As depicted in FIG. 3, the two FTUs 27 may be implemented with their digital processing shared on a single FTU DSP 79. In this implementation, the DSPs share certain functionality such as processing and memory. In some embodiments, this facilitates the timely transfer of fragments between FTUs 27 in response to noise events such as a SHINE event. Although two FTUs 27 have been depicted for each aggregation module in FIGS. 2-3, any suitable number of FTUs 27 (associated with any suitable number of data links 18) may be included in each aggregation module 25. And while two FTUs 27 are depicted and described as having digital processing implemented on a single DSP, it will be understood that each FTU 27 may be implemented on its own FTU DSP 79 or that more than two FTUs 27 may be implemented on a single FTU DSP 79. Although not depicted in FIG. 3, each FTU 27 also includes analog front-end circuitry for performing analog processing between the FTU and the data links 18, for example to generate and receive signals that are transmitted over data links 18. In other embodiments, any suitable number of FTUs 27 may be implemented on any suitable combination of hardware, software, firmware, or any combination thereof.

As shown by FIG. 3, the components of the aggregation module 25 reside on a single printed circuit board (PCB) 77, and the aggregation module 25 is sometimes referred to as a "line card" or just "card." However, it is possible for the components of the aggregation module 25 to reside on more than one PCB, if desired.

The registers 72 store various configuration settings useful in the operation of the aggregation module 25. In this regard, the configuration settings preferably specify how various data packets and/or fragments are to be handled. As an example, the configuration settings may indicate how fragments received from a data link 18 are to be processed. In this regard, the configuration settings indicate which of the bonding engines 29 a-c (FIG. 2) is to receive a fragment for a particular data link 18 terminated by the aggregation module 25.

For example, the configuration settings may correlate the destination addresses or VLAN tags of data packets from the network 12 with port identifiers that identify the ports and, hence, FTUs through which the data packets are to be transmitted. The bonding engine 29 residing on the aggregation module 25 may use such configuration settings to allocate fragments across the data links 18 of a bonding group. For example, assume that a particular bonding group is to carry the data from data packets having a particular VLAN address. Further assume that the bonding engine 29a (FIG. 2) services such bonding group. In such example, the configuration settings in the registers 72a of the aggregation module 25a correlate the foregoing VLAN address with the port identifiers for the data links 18 a-f of the bonding group (i.e., the identifiers identifying which of the FTUs 27 a-f and data links 18 a-f are in the bonding group). The bonding engine 29a uses such port identifiers when fragmenting a data packet having the foregoing VLAN tag. In this regard, for the fragments from such a data packet, the bonding engine 29a selects from the correlated port identifiers for attaching routing information to the fragments. Thus, the fragments from the data packet are only transmitted to and carried by the data links 18 a-f of the bonding group.

Bonding engine 29 of an aggregation module 25 also controls the monitoring and handling of noise events such as SHINE events. The initial identification of a SHINE event may be performed by an FTU 27, a bonding engine 29, or FTU 27 and bonding engine 29 operating together. In response to the identification of a SHINE event, the bonding engine 29 determines whether the fragments located in the buffer 31 of the FTU 27 associated with an impacted data link 18 can be transferred to the buffer 31 of another FTU 27 of the bonding group for transmission. If the fragments stored in the buffer 31 of the impacted FTU 27 are to be transferred to another FTU 27 of the bonding group, the bonding engine 29 determines a transfer path to the buffers 31 of the receiving FTU 27. This may include a direct transfer to another FTU 27 within an FTU DSP 79, a local transfer to another FTU 27 within the same aggregation module 25, or an external transfer to an FTU 27 located on another aggregation module 25.

Figure 4:
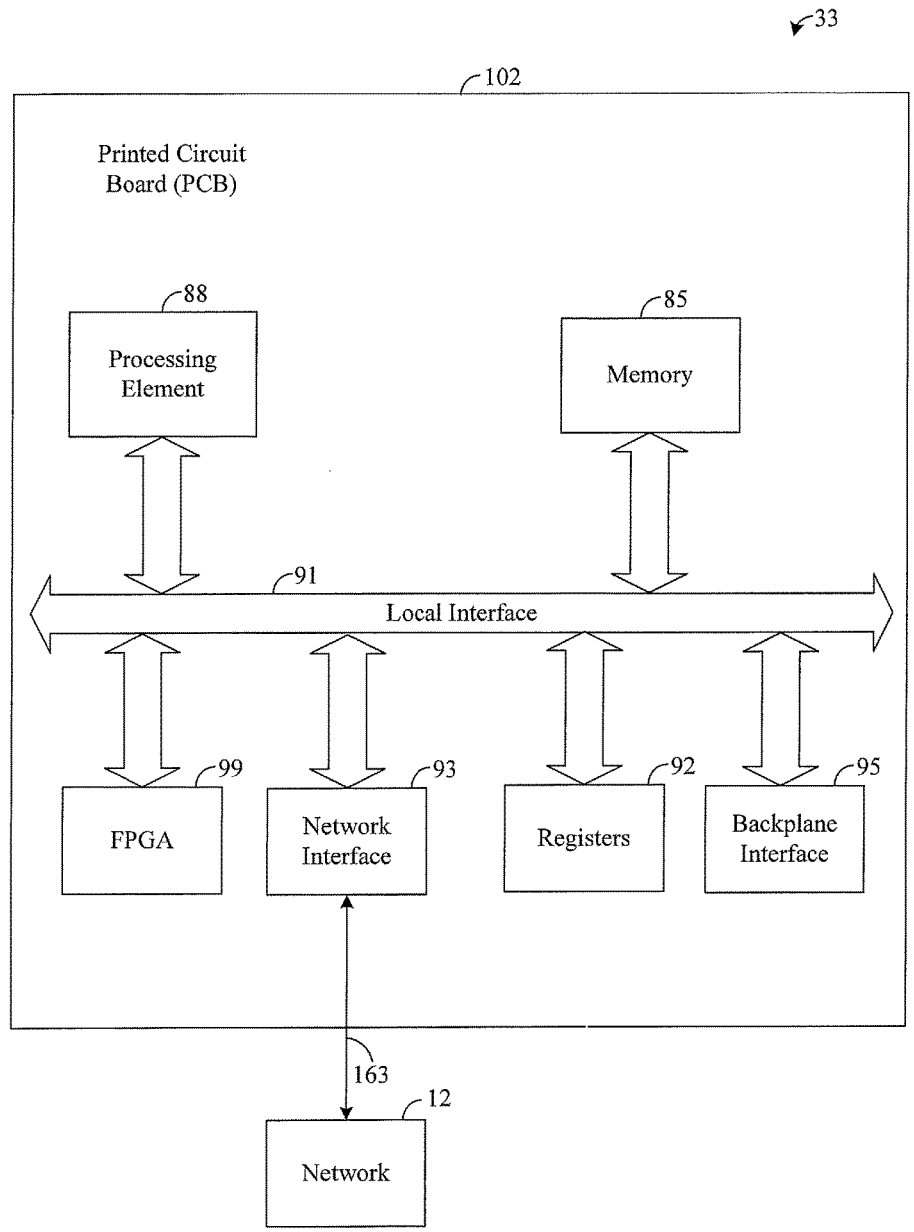
FIG. 4 is a block diagram illustrating an exemplary embodiment of a switch module, such as is depicted by FIG. 2.

FIG. 4 depicts an exemplary embodiment of the switch module 33. The exemplary embodiment of the switch module 33 depicted by FIG. 4 comprises at least one processing element 88, such as a digital signal processor (DSP) or a central processing unit (CPU), that communicates to and drives the other elements within the switch module 33 via a local interface 91, which can include at least one bus. The processing for switch module 33 may be embodied in software that runs on processing element 88 and is stored in memory 85, and/or hardware logic of a field programmable gate array (FPGA) 99. In some embodiments, switch module 33 may also include a bonding engine 29, which may also be embodied in software that runs on processing element 88 and is stored in memory 85, and/or hardware logic of a field programmable gate array (FPGA) 99.

Furthermore, the switch module 33 has registers 92 for storing various configuration settings, as will be described in more detail hereafter. A backplane interface 95 comprises a connector for interfacing the switch module 33 with a backplane of a chassis (not shown in FIG. 4). The switch module 33 has FPGA 99 for performing switching operations, as will be described in more detail hereafter. The switch module 33 also has a network interface 93 coupled to a network connection 163, such as a fiber optic cable. As shown by FIG. 4, the components of the switch module 33 reside on a single printed circuit board (PCB) 102, also referred to as "card," although it is possible for such components to reside on multiple PCBs in other embodiments.

The configuration settings in the registers 92 indicate how data from the network 12 and the aggregation modules 25 are to be forwarded. When a message (e.g., a data packet or a fragment) is received, the FPGA 99 determines where to send the message based on the configuration settings in the registers 92. In one exemplary embodiment, the data packets received from the network 12 have VLAN tags in their headers, and the registers 92 indicate where the packets are to be transmitted based on their VLAN tags. Thus, upon receiving a data packet from the network 12, the FPGA 99 consults the registers 92 using the VLAN tag in the packet's header and, based on information in the registers 92, determines which of the aggregation modules 25 *a-c* is to receive the packet. The FPGA 99 then transmits the packet to the appropriate aggregation module 25 *a-c* via the backplane interface 95.

In one exemplary embodiment, fragments received by the switch module 33 from the modules 25 *a-c* have port identifiers in their headers, and the registers 92 indicate where the fragments are to be transmitted based on their port identifiers. Thus, upon receiving a fragment from an aggregation module 25 *a-c*, the FPGA 99 consults the registers 92 using the port identifier in the fragment's header and, based on information in the registers 92, determines which of the modules 25 *a-c* is to receive the packet. The FPGA 99 then transmits the packet to the appropriate module 25 *a-c* via the backplane interface 95.

As described above, a particular bonding engine 29 of a bonding group is configured to fragment data packets and to allocate the fragments to different FTUs 27 *a-f* for transmission of the fragments across different data links 18 *a-f* of the bonding group. Each fragment allocated to a particular FTU 27 is transmitted to that FTU 27 where the fragment is buffered prior to transmission across the FTU's corresponding data link 18. In one exemplary embodiment, the bonding engine 29 monitors for noise events occurring on the data links 18 of its bonding group to determine when a noise event, such as a SHINE event, is causing a long delay in successful data transmissions across any one of the data links 18. As such an event is occurring, the bonding engine instructs the FTU 27 that is connected to the affected data link to transfer its buffered fragments (i.e., fragments that have been received by the FTU 27 but not successfully communicated to the CPE) to another FTU of the same bonding group that is currently capable of communicating across its corresponding data link 18. Further, the FTU 27 receiving the transferred fragments is configured to prioritize transmission of fragments based on sequence identifiers such that the fragments earlier in the sequence (e.g., fragments having lower sequence identifiers) are transmitted earlier than fragments later in the sequence regardless of when the fragments were received by the FTU 27. Thus, a fragment that has been delayed in a first FTU before being transferred to a second FTU 27 may be transmitted from the second FTU 27 prior to a fragment that was received by the second FTU 27 before the transferred fragment. Such prioritization helps to ensure that fragments earlier in the sequence are received by the CPE sooner, thereby reducing differential delay. Indeed, transferring fragments from one FTU 27 to another in response to a long noise event, as described herein, helps to reduce the delay experienced by the fragments originally allocated to the affected FTU 27 so that the effect of the noise event on the differential delay at the CPE can be minimized. Exemplary methods for detecting noise events and transferring fragments will be described in more detail below.

Figure 5:
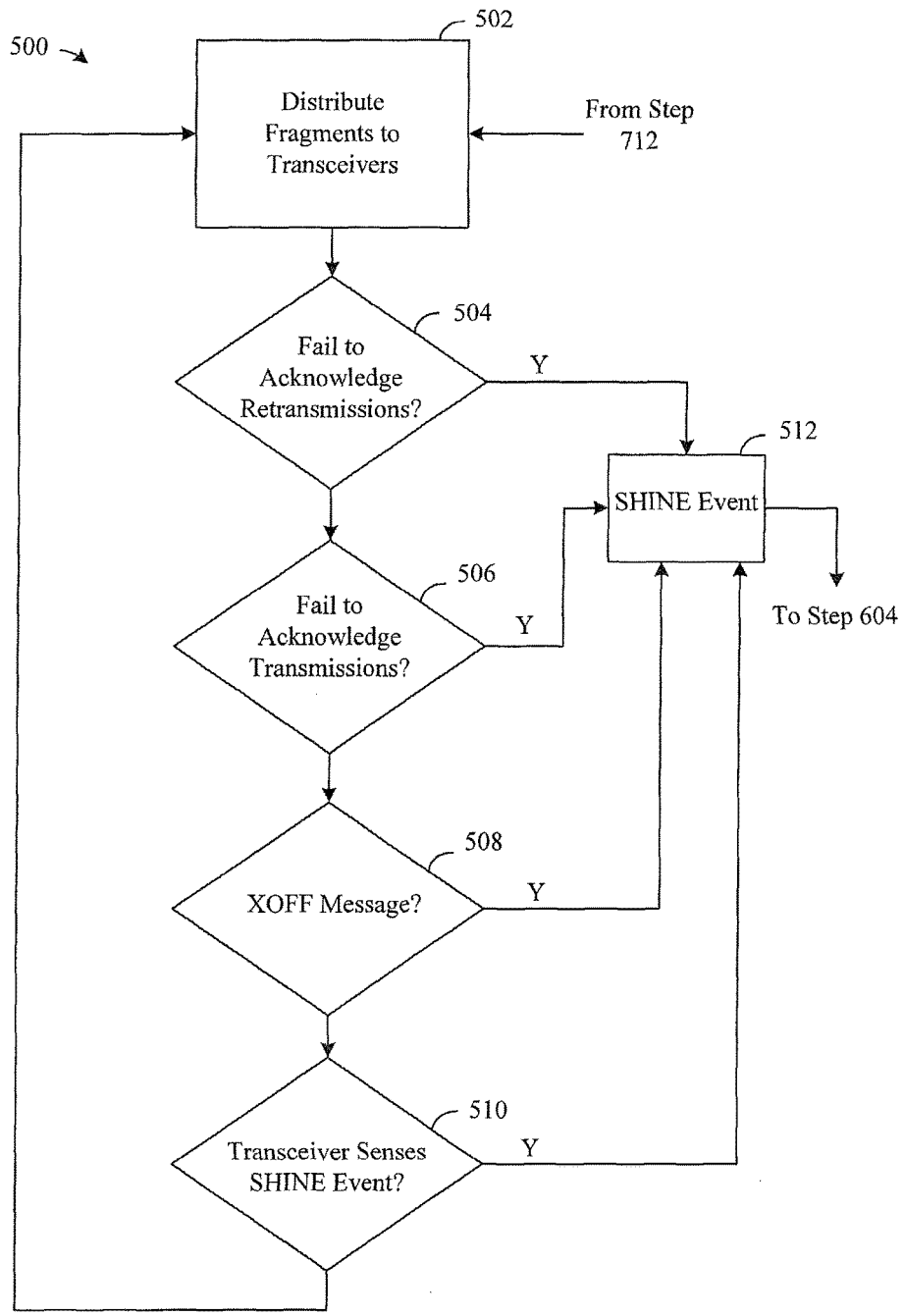
FIG. 5 is a flow chart illustrating an exemplary method of identifying a noise event.
Figure 6:
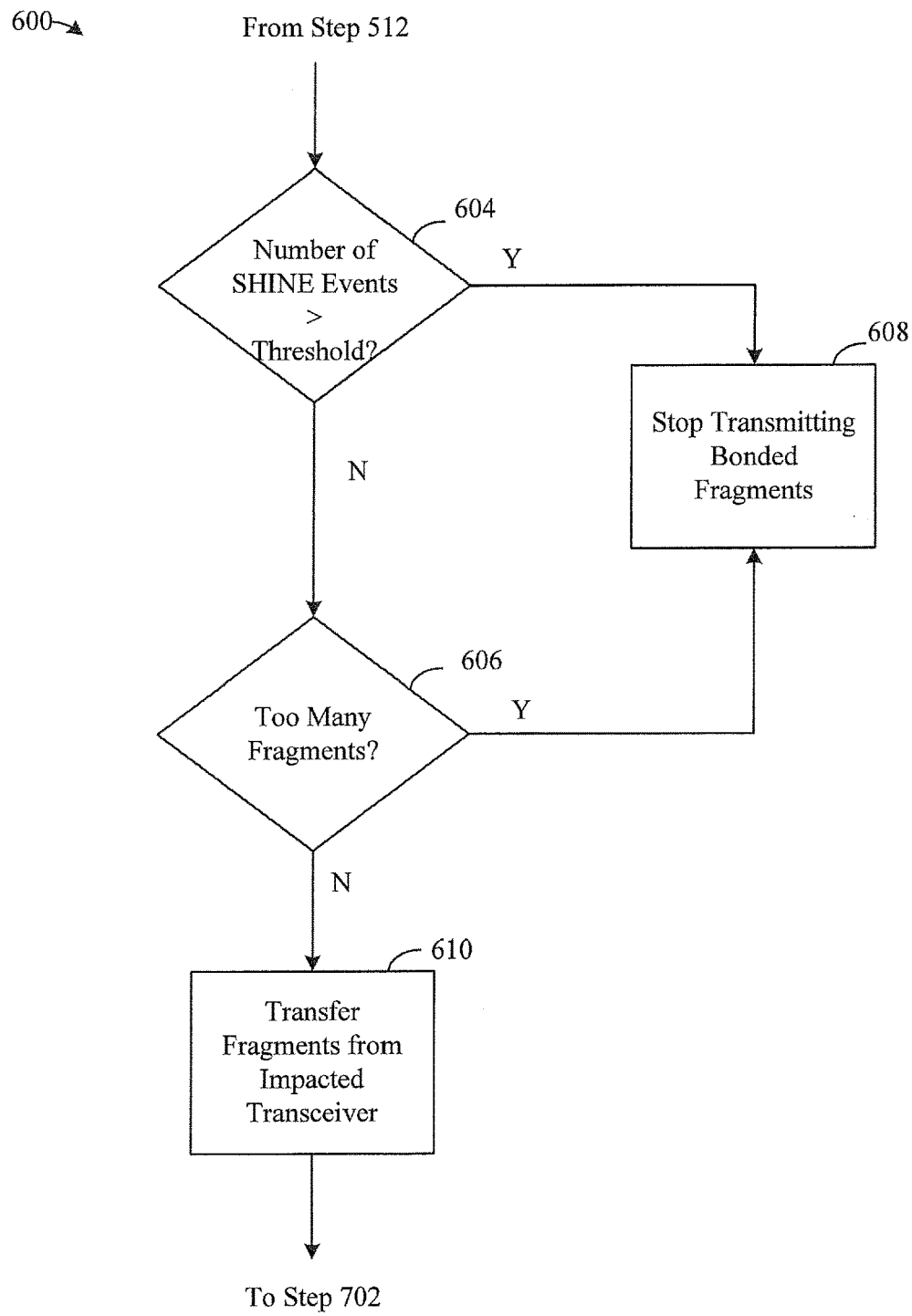
FIG. 6 is a flow chart illustrating an exemplary method of determining whether to transfer fragments in response to a noise event.
Figure 7:
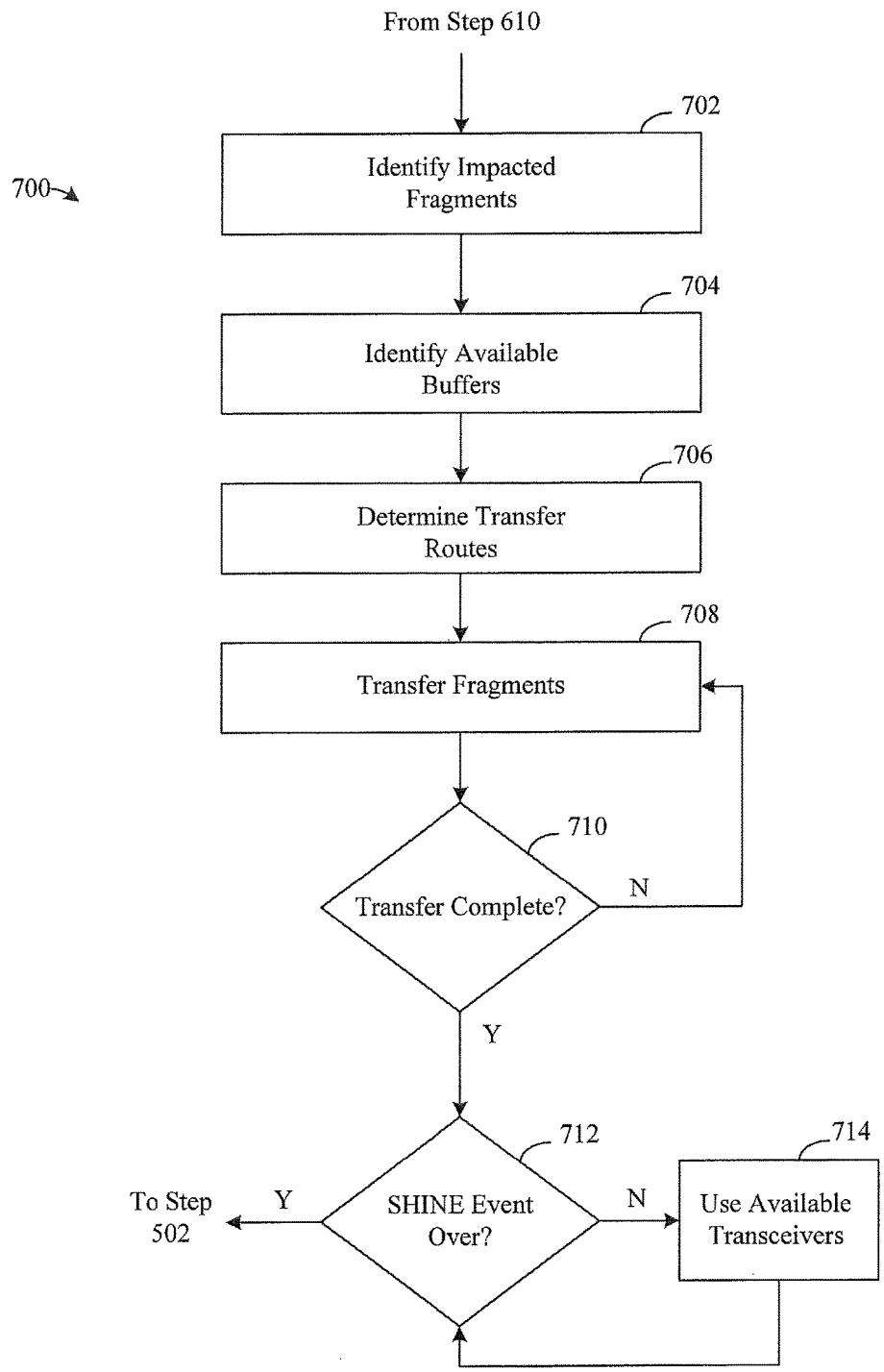
FIG. 7 is a flow chart illustrating an exemplary method of transferring fragments in response to a noise event.

FIGS. 5-7 depict methods for identifying a noise event, determining whether to transfer data in response to a noise event, and transferring data in response to a noise event. Although it will be understood that the systems and methods described herein may be applied to any suitable noise event, in the exemplary embodiments described herein the noise event will be described in the context of a SHINE event. While, for purposes of simplicity of explanation, the methods are shown and described as a series of steps, it is to be understood and appreciated that such illustrations or corresponding descriptions are not limited by the order of the steps, as some steps may occur in different orders and/or concurrently with other steps from what is depicted and described herein. Any non-sequential, or branched, flow illustrated via a flowchart should be understood to indicate that various other branches, flow paths, and orders of the steps, can be implemented which achieve the same or a similar result. Moreover, not all illustrated steps may be required to implement the methods described hereinafter.

FIG. 5 is a flow chart illustrating steps 500 of an exemplary method of identifying a SHINE event. At step 502, a bonding engine 29 distributes bonded fragments of data packets to a plurality of FTUs 27 *a-f* as described herein. FTUs 27 *a-f* encapsulate the fragments into DTUs that are stored in buffers 31 *a-f* to be transmitted over data links 18 *a-f*. Over time, each FTU 27 *a-f* pulls DTUs from its buffer or buffers and transmits such DTUs across the data link coupled to it. When a DTU is successfully received at a customer premises 17, a transceiver at the customer premises 17 transmits an acknowledgment back to the FTU a-f. If an FTU a-f fails to receive an acknowledgment for a DTU within a certain time after transmitting the DTU or receives a non-acknowledgement, the FTU 27 *a-f* assumes that the DTU was not successfully received and retransmits the DTU across the data link coupled to it. Each FTU 27 *a-f* may also perform other functions such as monitoring an associated data link 18, receiving DTUs from the data links 18, and communicating other information (e.g., data acknowledgments received over data links 18 *a-f*, XON/XOFF indications, etc.) to a bonding engine 29. Once a set of fragments associated with a data packet have been distributed to the FTUs 27 *a-f*, processing continues to step 504.

At step 504, it is determined whether any retransmissions from any of FTUs 27 *a-f* have not been acknowledged. As described herein, certain standards such as ITU-T G.998.4 and G.fast require retransmission of data that is not acknowledged upon the initial transmission. These retransmissions should be acknowledged if properly received at the CPE or customer premises 17. In step 504, it is determined whether a threshold number of retransmissions of the same DTU from a particular FTU 27 have not been acknowledged. For example, if any of the FTUs 27 *a-f* fails to receive an acknowledgement more than for a threshold number of consecutive retransmissions (e.g., two retransmissions), this may be indicative of a SHINE event. This determination may be made by bonding engine 29, the FTU 27, or any combination thereof. If the number of unacknowledged retransmissions exceeds the threshold, processing continues to step 512 where a SHINE event is indicated. Based on the indication of the SHINE event processing continues as described in FIGS. 6 and 7. Otherwise, processing continues to step 506.

At step 506, it is determined whether an excessive number of transmissions have gone unacknowledged within a time period. Each FTU 27, the bonding engine 29 associated with that FTU, or any combination thereof may monitor the number of transmissions that have not been acknowledged by the CPE. If an excessive number of transmissions have not been acknowledged (e.g., a percentage exceeding a threshold, such as 50% for example) within a time period, processing continues to step 512 where a SHINE event is indicated. In the case of a SHINE event, processing continues as described in FIGS. 6 and 7. If step 506 does not indicate a SHINE event, processing continues to step 508.

At step 508, each bonding engine 29 monitors the XON/XOFF message from the FTUs 27 that are bonded to that bonding engine 29. As described herein, an XOFF message may be indicative of a full buffer 31 of the FTU 27 or some other cause that prevents the FTU 27 from transmitting. Because the FTU 27 is unable to transmit, this is a possible indication that a SHINE event is preventing the transmission of fragments. In case of other root causes for the XOFF message, the effect for the bonding group is very similar to a SHINE event because transmission of fragments is not occurring. If the XOFF message is received by the bonding engine 29, processing continues to step 512 where a SHINE event is indicated and for processing as described in FIGS. 6 and 7. In some embodiments, the bonding engine 29 may determine whether the XOFF message persists for a threshold period of time before indicating a SHINE event, or may communicate with the FTU 27 that is providing the XOFF message to receive information relating to the cause of the XOFF message. If the threshold time is exceeded or the information indicates a SHINE event, then the bonding engine detects a SHINE event at step 512, and processing continues to step 604 of FIG. 6. Otherwise, processing continues to step 510.

At step 510, bonding engine 29 monitors messages from the subset of bonded FTUs 27 to determine whether any FTU 27 has sensed a SHINE event. Each FTU 27 may include circuitry that allows it to sense a SHINE event, for example, based on aberrant signal levels, error vectors, or any other suitable characteristic of a data link 18. If an FTU 27 senses a SHINE event, a message indicating the SHINE event is sent to the bonding engine 29. Processing continues to at step 512 where a SHINE event is indicated, and processing continues as described in FIGS. 6 and 7. If steps 504 to 510 have been completed without any indication of a SHINE event, processing may return to step 502.

FIG. 6 is a flow chart illustrating steps 600 of an exemplary method of determining whether to transfer fragments in response to a SHINE event. Although steps 600 will be described as being performed by bonding engine 29, it will be understood that the steps may be distributed over a plurality of bonding engines (e.g., bonding engines 29 *a-c*), among other processors such as a processor of switch module 33, any FTU DSP 79, or any combination thereof.

Once a SHINE event is detected, for example, a SHINE event that was identified at steps 500 of FIG. 5, bonding engine 29 at step 604 determines whether the number of FTUs within the bonding group experiencing a SHINE event exceeds a threshold. If the number of FTUs experiencing a SHINE event exceeds the threshold, this may indicate that even if fragments are transferred from an impacted FTU 27, it will not be possible to send the transferred fragments over the data link 18 within a suitable time period. For example, in an exemplary embodiment with six bonded FTUs 27 *a-f*, if more than two of the FTUs 27 *a-f* are experiencing a SHINE event, it may be necessary to stop transmitting all of the bonded fragments. If the number of SHINE events exceeds the threshold, processing continues to steps 608 and bonding engine 29 stops the transmission of all the bonded fragments, for example, by sending a message to each of the FTUs 27 *a-f* to stop transmitting. If the number of FTUs experiencing a SHINE event does not exceed the threshold, processing continues to step 606.

At step 606, bonding engine 29 determines whether the number of fragments that would be necessary to transfer between FTUs 27 is excessive. For example, bonding engine 29 may determine the number of fragments that need to be transferred, the availability of the buffers 31 at each of the FTUs 27 that are to receive the transferred fragments, and the time it would take to perform the transfers. If the buffers 31 of the receiving FTUs 27 are unable to accommodate the transferred fragments, or if the time to transfer the fragments would exceed a threshold time, then the number of fragments to be transferred is excessive and processing continues to step 608, where the bonding engine 29 causes the FTUs 27 to stop transmitting bonded fragments. If the number of fragments to be transferred is not excessive, processing continues to step 610.

At step 610, bonding engine 29 determines to transfer fragments from the impacted FTUs 27, for example, as described in FIG. 7. In this regard, FIG. 7 is a flow chart illustrating steps 700 of an exemplary method of transferring fragments in response to a SHINE event. Although steps 700 will be described as being performed by bonding engine 29, it will be understood that the steps can be distributed over plurality of bonding engines (e.g., bonding engines 29 a-c) or among other processors, such as the processor of switch module 33, any FTU DSP 79, or any combination thereof.

At step 702, bonding engine 29 identifies the fragments that were impacted by the SHINE event. Although bonding engine 29 may identify the impacted fragments in any suitable matter, in one embodiment each of the FTUs 27 communicates to bonding engine 29 a list of sequence identifiers of the fragments that have yet to be successfully transferred from the respective FTU 27. As an example, a given FTU 27 may provide the sequence identifier of each fragment that is buffered by the FTU 27, including fragments that have been transmitted across the data link coupled to it for which an acknowledgement from the CPE at the other end of the data link has not been received. Thus, for an FTU impacted by the SHINE event, the bonding engine 29 is aware of each fragment in the FTU that is being delayed due to the occurrence of the SHINE event. Once the bonding engine 29 identifies the fragments impacted by the SHINE event, processing then continues to step 704.

At step 704, bonding engine 29 identifies the available buffers 31 for each of the FTUs 27 that were not impacted by the SHINE event and the amount of space in those buffers 31. For example, as described above, each FTU 27 may transmit a list of sequence identifiers of the fragments that have yet to be successfully communicated. For a given FTU, the bonding engine 29 is aware of the size of each fragment that remains in the FTU 27 and the buffer capacity of the FTU 27. Using such information, the bonding engine 29 may calculate the amount of available space in the FTU's buffers. Processing then continues to step 706.

At step 706, bonding engine 29 determines transfer paths from the impacted FTUs 27 to the non-impacted FTUs 27. The transfer paths are based on the available buffer 31 space in the non-impacted FTUs 27, the amount of data that needs to be transferred from the impacted FTUs 27, and the speed of the transmission paths between FTUs 27. In one embodiment, impacted fragments are transferred between FTUs 27 that share a FTU DSP 79 as a first transfer path. A second transfer path is between FTUs 27 that are located on the same aggregation module 25 but are not located on the same FTU DSP 79. A third transfer path is from an FTU 27 on a first aggregation module 25 to an FTU 27 located on another aggregation module 25. In some embodiments, bonding engine 29 may also have a record of the buffered fragments such that these fragments can be transferred directly from bonding engine 29 to an FTU 27 on another FTU DSP 79 or to an FTU 27 on another aggregation module 25. Processing then continues to step 708.

At step 708, the fragments are transferred based on the transfer paths determined in step 706. Processing continues to step 710, at which bonding engine 29 determines whether the transfer is complete. If the transfer is not complete, steps 708 and 710 are repeated until the transfer is complete. Once the transfer is complete, processing continues to step 712.

At step 712, bonding engine 29 determines whether the SHINE event is over. As long as any of the indicators of the SHINE event from FIG. 5 are active, the SHINE event is not over and processing may continue to step 714. At step 714, bonding engine 29 may resume bonding fragment data, providing the fragments only to the available FTUs 27. Bonding engine may continue to send fragments only to the available FTUs 27 at step 714 until the SHINE event is over at step 712. Once the SHINE event is over, normal operation is resumed, and processing returns to step 502 of FIG. 5.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

Now, therefore, the following is claimed:

1. An access multiplexer system, comprising:
a bonding engine configured to receive a data packet and generate a plurality of fragments for the data packet, wherein each fragment includes a sequence identifier that allows the data packet to be reconstructed from the plurality of fragments, and wherein the bonding engine associates each fragment with a respective one of a plurality of data links;
a first transmitter associated with a first data link of the plurality of data links, the first transmitter having a first buffer, wherein the first transmitter is configured to (a) receive a first subset of the plurality of fragments and (b) store the first subset of fragments in the first buffer; and
a second transmitter associated with a second data link of the plurality of data links, the second transmitter having a second buffer, wherein the second transmitter is configured to (a) receive a second subset of the plurality of fragments, (b) store the second subset of fragments in the second buffer, and (c) transmit the second subset of fragments over the second data link,
wherein one or more of the bonding engine and the first transmitter identifies a noise event associated with the first data link, and
wherein the first subset of fragments is transferred from the first buffer to the second buffer based on the identification of the noise event.

2. The system of claim 1, wherein the noise event is identified based on the failure of the first transmitter to receive an acknowledgment for a threshold number of retransmissions.

3. The system of claim 1, wherein the noise event is identified based on the failure of the first transmitter to receive an acknowledgment for a threshold number of transmissions over a threshold time period.

4. The system of claim 1, wherein the noise event is identified based on the bonding engine receiving an indication that the first transmitter is unable to accept additional fragments.

5. The system of claim 1, wherein the noise event is identified based on the first transmitter measuring an aberrant signal on the first data link.

6. The system of claim 1, wherein the first transmitter and second transmitter are located on the same digital signal processor, and wherein the first subset of fragments is directly transferred from the first buffer to the second buffer.

7. The system of claim 1, wherein the second buffers a third subset of fragments that are not associated with the data packet prior to transfer of the first subset of fragments from the first buffer to the second buffer, and
wherein the second transmitter is configured to prioritize the first subset of fragments over the third subset of fragments such that the first subset of fragments are transmitted over the second data link prior to the third subset of fragments being transmitted over the second data link.

8. The system of claim 1, wherein the noise event is a single high impulse noise event.

9. A method comprising:
receiving a data packet;
generating a plurality of fragments for the data packet, wherein each fragment includes a sequence identifier that allows the data packet to be reconstructed from the plurality of fragments;
associating each fragment with one of a plurality of data links;
providing a first subset of the plurality of fragments to a first transmitter comprising a first buffer, wherein the first transmitter is associated with a first data link of the plurality of data links;
storing the first subset of fragments in the first buffer of the first transmitter;
providing a second subset of the plurality of fragments to a second transmitter comprising a second buffer, wherein the second transmitter is associated with a second data link of the plurality of data links;
storing the second subset of fragments in the second buffer of the second transmitter;
identifying a noise event associated with the first data link; and
transferring the first subset of fragments from the first buffer to the second buffer based on the identification of the noise event.

10. The method of claim 9, wherein identifying the noise event comprises failing to receive an acknowledgment over the first data link for a threshold number of retransmissions.

11. The method of claim 9, wherein identifying the noise event comprises failing to receive an acknowledgment over the first data link for a threshold number of transmissions over a threshold time period.

12. The method of claim 9, wherein identifying the noise event comprises receiving an indication that a transmitter associated with the first data link is unable to accept additional fragments.

13. The method of claim 9, wherein identifying the noise event comprises receiving an indication that the first transmitter has measured an aberrant signal on the first data link.

14. The method of claim 9, wherein the first buffer and the second buffer are located on the same digital signal processor.

15. The method of claim 9, further comprising:
buffering a third subset of fragments in the second buffer prior to the transferring;
prioritizing the first subset of fragments over the third subset of fragments; and
transmitting, based on the prioritizing, the first subset of fragments over the second data link prior to transmitting the third subset of fragments over the second data link.

16. The method of claim 9, wherein the noise event is a single high impulse noise event.

17. An access multiplexer system comprising:
a switch module; and
a plurality of line cards, each of the plurality of line cards comprising:
(a) a bonding engine configured to receive, from the switch module, a data packet and to generate a plurality of fragments from the data packet, wherein each fragment is associated with a respective one of a plurality of data links; and
(b) one or more transmitters, respectively associated with a data link of the plurality of data links, in a 1:1 correspondence, wherein each transmitter includes a respective buffer configured to store a respective subset of the plurality of fragments,
wherein a first line card of the plurality of line cards has a first transmitter associated with a first data link, the first transmitter having a first buffer that stores a first subset of fragments,
wherein a second line card of the plurality of line cards has a second transmitter associated with a second data link, the second data link being different than the first data link, and the second transmitter having a second buffer that stores a second subset of fragments, and
wherein, in response to the identification of a noise event associated with the first data link, the bonding engine of the first line card transfers the first subset of fragments from the first buffer of the first line card to the second buffer of the second line card.

18. The access multiplexer system of claim 17, further comprising:
a backplane connected to the switch module, the backplane being interfaced with each of the plurality of line cards,
wherein the switch module transmits the data packet to the first line card via the backplane, based on information in the data packet's header, and
wherein the first subset of fragments is transferred, by the first bonding engine, from the first buffer, via the backplane, to the second bonding engine, which stores the first subset of fragments in the second buffer.

19. A method comprising:
receiving a data packet;
generating a plurality of fragments for the data packet, wherein each fragment includes a sequence identifier that allows the data packet to be reconstructed from the plurality of fragments;
transmitting a first subset of the plurality of fragments to a first transceiver unit having a first buffer for buffering fragments to be transmitted by the first transceiver unit across a first data link coupled to the first transceiver unit;
storing the first subset of fragments in the first buffer;
transmitting a second subset of the plurality of fragments to a second transceiver unit having a second buffer for buffering fragments to be transmitted by the second transceiver unit across a second data link coupled to and terminated by the second transceiver unit;
storing the second subset of fragments in the second buffer;
identifying a noise event associated with the first data link; and
transferring the first subset of fragments from the first buffer to the second buffer based on the identification of the noise event.

20. The method of claim 19, further comprising:
buffering a third subset of fragments in the second buffer prior to the transferring;
prioritizing the first subset of fragments over the third subset of fragments; and
transmitting, based on the prioritizing, the first subset of fragments over the second data link prior to transmitting the third subset of fragments over the second data link.

21. The method of claim 19, wherein the first transceiver unit resides on a first line card, and wherein the second transceiver unit resides on a second line card.

* * * * *